US007379968B2

(12) United States Patent
Schuh

(10) Patent No.: US 7,379,968 B2
(45) Date of Patent: May 27, 2008

(54) MULTIPLE MODERATION FOR NETWORKED CONFERENCES

(75) Inventor: Brian Joel Schuh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 10/709,885

(22) Filed: Jun. 3, 2004

(65) Prior Publication Data
US 2005/0273510 A1 Dec. 8, 2005

(51) Int. Cl.
*G06F 15/16* (2006.01)
(52) U.S. Cl. .................. 709/204; 715/751; 715/753; 348/14.08
(58) Field of Classification Search ............... 709/204; 715/751, 753; 370/260; 379/158; 348/14.08, 348/14.09, 14.1
See application file for complete search history.

(56) References Cited

U.S. PATENT DOCUMENTS 5,440,624 A * 8/1995 Schoof, II .............. 379/202.01
5,587,928 A * 12/1996 Jones et al. .................. 709/204
6,343,313 B1   1/2002 Salesky et al.
6,484,196 B1  11/2002 Maurille
6,487,585 B1  11/2002 Yurkovic
6,789,105 B2 * 9/2004 Ludwig et al. ............. 709/204
7,003,728 B2 * 2/2006 Berque ....................... 715/753
2002/0078153 A1   6/2002 Chung et al.
2003/0105820 A1   6/2003 Haims et al.
2003/0227479 A1* 12/2003 Mizrahi et al. ............. 345/753

* cited by examiner

*Primary Examiner*—Frantz B Jean
(74) *Attorney, Agent, or Firm*—Howard M. Cohn; Jay H. Anderson

(57) ABSTRACT

A networked conferencing system is described wherein multiple moderation of conferences is accommodated by permitting a conference moderator to designate one ore more alternate conference moderators. Each alternate moderator has access to at least a subset of conference moderation functions, thereby permitting any alternate moderator to take at least partial control of conference proceedings in the absence of the "main" or "primary" moderator.

17 Claims, 2 Drawing Sheets

MULTIPLE MODERATION FOR NETWORKED CONFERENCES

BACKGROUND OF INVENTION

The present invention relates to networked conferencing and collaboration systems, particularly synchronous web conference systems.

The rapid growth of networked communications over the last decade, particularly Internet communications, has produced numerous new methods of business communications, e.g, between members of a workgroup. For example, many activities that were previously carried out primarily by face-to-face meetings of team members congregating at a single location in a conference room can now be carried out electronically in "virtual" conference rooms via computer communications mechanisms. The participant in virtual conferences can be quite distant from one another, but communicate quickly, conveniently and effectively. Such virtual conferencing capability is known as "networked conferencing" or "web conferencing".

There are two primary types of web conferencing: synchronous and asynchronous. Asynchronous conferencing does not occur in real-time, but relies on common access to text, video, images and other resources stored on a server. Generally, interaction between participants in asynchronous conferences is not immediate or conversational, but more like letter writing. Examples of mechanisms useful for asynchronous conferencing include: Bulletin Board Systems (BBS), Usenet Newsgroups, E-mail, Group forums (e.g., Yahoo groups), etc.

Synchronous conferencing, by way of contrast, occurs in real-time or near real-time, with a high-degree of immediacy and exhibiting a more conversational style of interaction. Examples of synchronous communications mechanisms useful in synchronous conferencing include: Instant Messaging (IM), video conferencing, Voice over IP (VOIP), streaming audio and/or video, etc.

Most of the "basic", unmoderated synchronous communications mechanisms, such as IM, have a bit of a "free-for-all" feel to them, with many simultaneous cross-conversations going on at once. Most true networked conferencing systems are moderated, whereby a designated moderator controls who can participate and who can "speak" at any given time. In most business settings, the more organized nature of moderated conferencing is greatly preferred. Modern networked conferencing systems also provide security and encryption features so that only authorized participants are able to view the conference materials and discussion.

Moderated conferencing places control over who may present what at any given time in the hands of a moderator typically the individual who arranges, schedules and organizes the conference. The moderator sets up the conference, determines when it will occur, determines who will attend, sends out "invitations", etc. . . . Many conferencing systems also provide advanced scheduling mechanisms to permit the conference to be scheduled around the availability of specific critical participants.

In setting up the networked conference, the moderator sends out "invitations" to participate (e.g., via e-mail or other messaging services). A facility that permits invitees to respond as to whether or not they will participate is often provided so that the moderator knows how many participants can be expected. Typically, the moderator can send out one or more reminders to prospective participants about the upcoming conference.

Networked conferencing systems typically integrate multiple communications mechanisms. For example, a typical conferencing system might permit text messaging, similar to IM, in conjunction with a virtual "whiteboard" whereby a presenter at the conference can transmit images and graphics to participant. There is often a capability for the presenter to perform live "highlighting" and marking on the virtual whiteboard. Other capabilities, such as interactive audio communications (e.g., via VOIP) and/or video images can be included in the conference resources available to participants. Typically, a moderator controls who is a "presenter" at any given time. The presenter is given access to the conference resources by the moderator for the purpose of presenting text, images, etc. to all of the participants.

Typically, the moderator can, "on the fly", promote any participant to be the presenter, thereby allowing that participant to "drive" the conferencing system by controlling the conference resources. Conversely, a presenter whose presentation is completed can be demoted to participant status. The presenter controls exactly what conference participants see on their network-connected computers at any given time. Such networked conferencing generally provides such features as slideshows, desktop sharing, control passing, text messaging, file transfers, etc. Some systems include a "hand-raising" function whereby participants can indicate to the presenter or to the moderator that they have a question or other need to be recognized.

Networked conferencing systems typically employ a client-server architecture whereby each participant's client software (running on the participant's computer or workstation) connects to a conference server. When participant "logs in" to the conference, the participant's identification determines the permissions granted to his client software by the server. Accordingly, when the moderator of a conference logs in, he is given the broadest access rights to control the conference and change other participants' permissions (e.g., to be the presenter, to permit the participant to "speak" publicly to the group, etc.). The conference server controls all communications with the various clients according to a set of permissions granted to the conference participant logged in on that client.

FIG. 1 is a block diagram of a typical prior-art net-worked conferencing system 100. A web conference server 102 includes conference control services 104 and access control services 106 that govern access to conference resources 108 (e.g., whiteboard functions, images, video streaming, etc.) according to moderator permissions 112, presenter permissions 114, and other permissions 116. The moderator permission 112 are given only to the dedicated moderator, who in addition to the capabilities listed hereinabove (scheduling, inviting, reminding, etc) has the sole ability to convene the conference, adjourn the conference, admit and/or exclude specific participants, designate the presenter, etc. The presenter permissions 114 typically comprise a subset of moderator permissions that permit the presenter to "speak" to the conference, to place images and markings on the "whiteboard", to acknowledge individual participants for questions/answers, etc. However, the presenter generally does not have over-all control of the conference and cannot designate other presenters. The "other" permissions 116 include access rights granted to general conference participants, including ability to view the "whiteboard" and other conference materials, to participate in discussions when appropriate, etc. Presenter permissions 114 can also be separate from the moderator permissions such that only the presenter has access to presentation functions. In such a system, the moderator would have to confer presenter status upon himself to gain direct access to presentation functions.

The conference server 102 communicates with clients 118A, 118B, 118C, 118D, 118E, . . . 118'n' via a communications network 110. The communications network 110 can be a corporate intranet, a wide area LAN, the Internet, or any suitable communications network. When a participant "logs in" via a client 118'x', the participant's login identity determines which set of access permissions apply. Access control services 106 determine, according to those permissions, which aspects of conference services can be controlled by each client 118'x', e.g., by refusing requests for access to unauthorized functions and/or by disabling user interface features that provide access to authorized functions. The moderator's login identity identifies him as the moderator, etc. In FIG. 1, a moderator participant at client 118A is logged in as the moderator, while conference participants at all other clients 118'x' are logged in as participants. The moderator can designate any participant to be a presenter, giving that participant presenter status as defined by the presenter permissions.

A significant problem with present conferencing systems is that a single individual (usually the individual that sets up the conference) is designated as the "moderator". If, when the scheduled conference time arrives, the moderator is unavailable or is unable to access the conference system, the entire conference is delayed. Only the moderator can "convene" the conference. If the moderator steps away when one presenter finishes, the conference may become blocked while waiting for the moderator to designate another presenter or to permit general discussion. At any point, if the moderator becomes unavailable, it is possible that conference progress will cease until the moderator returns.

If moderator is delayed, the conference start may be delayed, with all participants left waiting. In the worst case, when the moderator is completely unavailable or cannot be reached, another person must initiate a new web conference, thereby making that person the moderator of the new conference. That person must quickly send notifications out to all of the participants informing them of the change of venue, wasting a great deal of time and creating the potential for miscommunications.

SUMMARY OF INVENTION

The present inventive technique overcomes the problems cited above by permitting moderator to designate one or more alternate moderators. Each alternate moderator is permitted to control selected aspects of the conference, as determined by the moderator, who now becomes a main or "primary" moderator. For example, the primary moderator might grant one or more alternate moderators permission to convene and adjourn the conference and to designate presenters. This capability might be conditionally granted, taking effect only in the event that the moderator is not "present" (logged in). Alternatively, the moderator might grant full access rights to one or more alternate moderators, permitting the alternate moderators to reschedule, invite participants, send reminders, cancel the conference, designate other alternate moderators, etc.

This provision for alternate moderators is accomplished by providing the conference server with additional permissions that govern the access rights of alternate moderators, and the ability to grant access to selected moderator functions (according to the additional permissions) to more than one individual (participant). Instead of granting control of high-level conference functions to only one moderator, the conference server would grant control of those functions to any alternate moderator according to permissions granted to the alternate moderator by the primary moderator. The primary moderator is typically the individual that creates/initiates the conference.

According to one aspect of the invention, the primary moderator can designate one or more alternate moderators at the time the conference is created. Alternatively and/or additionally, the primary moderator can add and/or remove alternate moderators at any time after the conference in created.

According to another aspect of the invention, permission to designate and/or remove additional alternate moderators can be granted to one or more alternate moderators.

According to another aspect of the invention, the moderator can transfer primary moderator status to another individual (by identifying the "new" primary moderator to the system) after the conference is created. This allows the moderator the option of stepping down and permitting another individual to take control of conference management.

BRIEF DESCRIPTION OF DRAWINGS

These and further features of the present invention will be apparent with reference to the following description and drawing, wherein.

DETAILED DESCRIPTION

The present inventive technique extends the concept of conference moderation by permitting more than one individual to have at least limited moderator privileges. Such individuals are designated by the conference moderator and are known as alternate moderators. By granting selected moderator privileges to one or more alternate moderators, any alternate moderator can take over control of a conference in the absence of the "main" or "primary" moderator, permitting conferencing to proceed smoothly and without delay.

Figure 1:
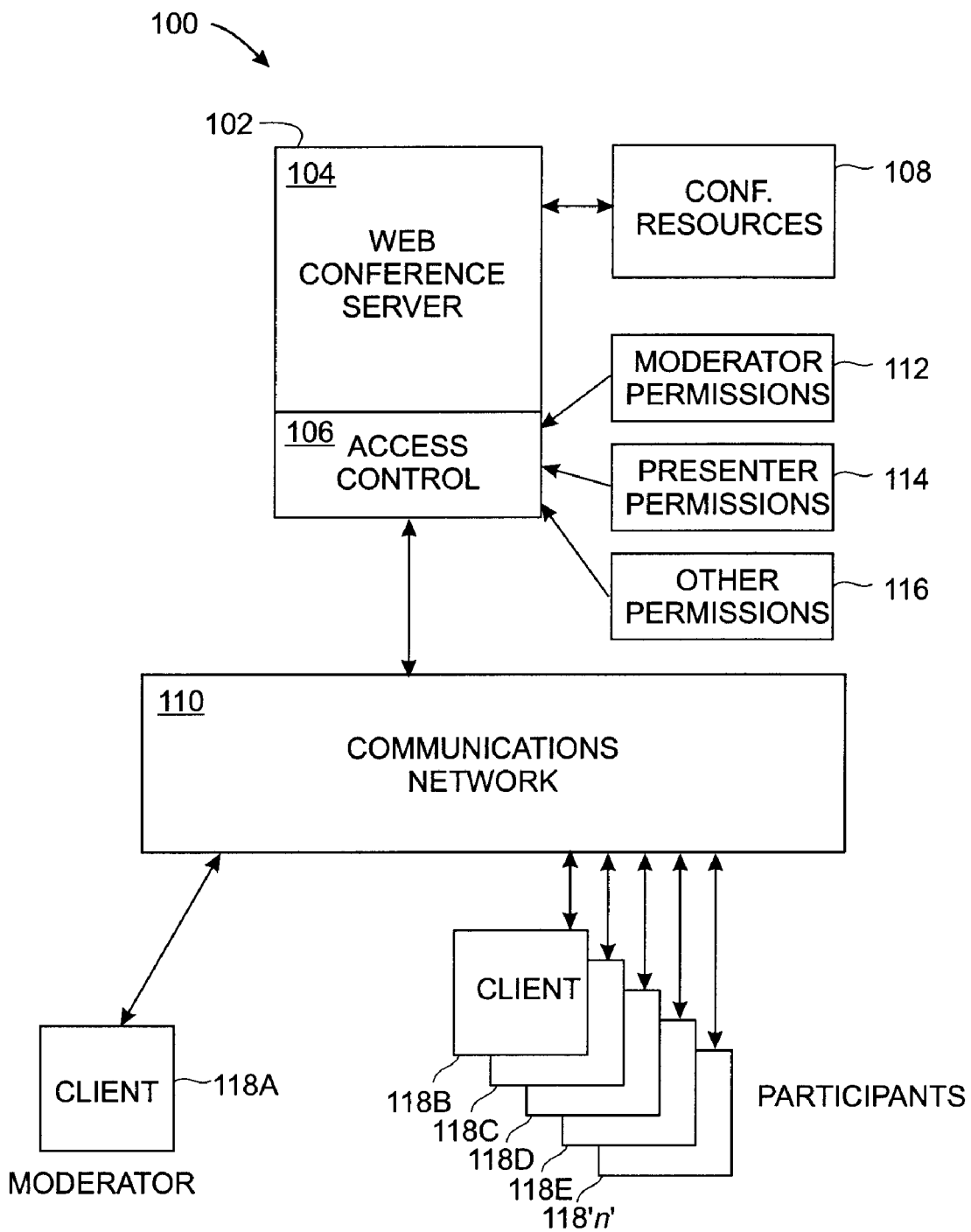
FIG. 1 is block diagram of a networked conferencing system, according to the prior art.
Figure 2:
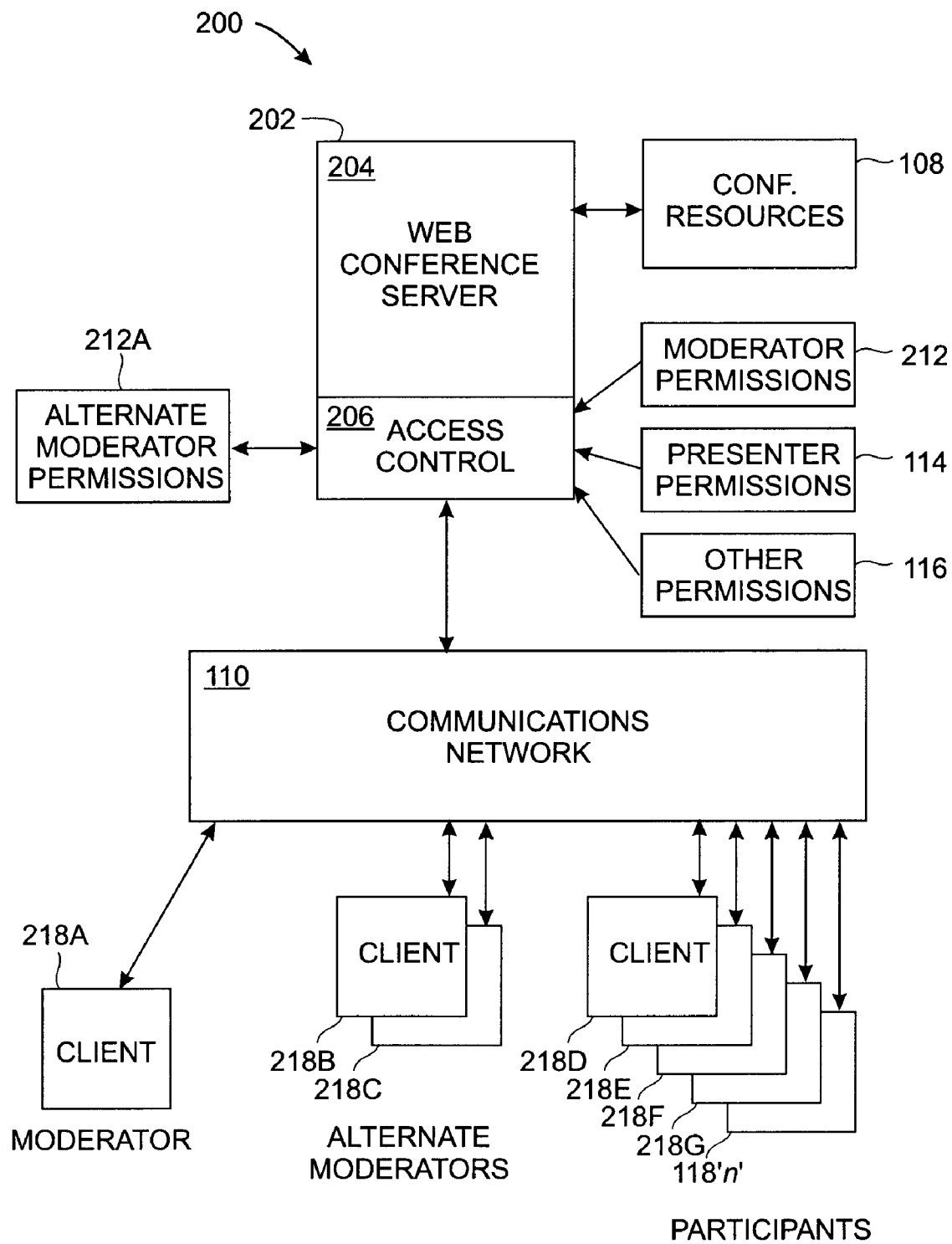
FIG. 2 is a block diagram of a networked conferencing system, in accordance with the present invention.

FIG. 2 is a block diagram of a networked conferencing system 200 capable of granting moderator status to more than one individual, in accordance with the invention. Similar to the networked conference system of FIG. 1, a web conference server 202 includes conference control services 204 and access control services 206 that govern access to conference resources 108 (e.g., whiteboard functions, images, video streaming, etc.) according to a set of moderator permissions 212, a set of alternate moderator permissions 212A, a set of presenter permissions 114, and a set of other permissions 116. The moderator permissions 212 provide access to all aspects of conference creation and management and are given to the "primary" moderator, generally the individual who sets up the conference. Moderator permissions 212 generally provide access to such high-level conference control functions as scheduling, management of the list of participants, the ability to send out conference invitations, reminders, etc., and the ability to convene the conference, adjourn the conference, admit and/or exclude specific participants, designate the presenter, etc. In addition, the primary moderator can specify one or more alternate moderators and specify the set of alternate moderator permissions 212A that will determine which conference control functions can be accessed by the alternate moderator(s). The alternate moderator permissions 212A can be specified on an individual basis, with each alternate moderator having a personalized set of permissions, or can be specified as a single set of alternate moderator permissions that applies equally to all alternate moderators.

As in the system of FIG. 1, the presenter permissions 114 typically comprise a subset of moderator permissions that permit the presenter to "speak" to the conference, to place images and markings on the "whiteboard", to acknowledge individual participants for questions/answers, etc. However, the presenter generally does not have overall control of the conference and cannot designate other presenters. The "other" permissions 116 include access rights granted to general conference participants, including ability to view the "whiteboard" and other conference materials, to participate in discussions, when appropriate, etc. Presenter permissions 114 can also be separate and distinct from the moderator permissions 212 and alternate moderator permissions 212A, such that only the presenter has access to presentation functions. In such a system, the moderator and/or alternate moderators would have to confer presenter status upon themselves to gain direct access to presentation functions.

The conference server 202 communicates with clients 218A, 218B, 218C, 218D, 218E, 218F, 218G, . . . 218'n' via a communications network 110. The communications network 110 can be a corporate intranet, a wide area LAN, the Internet, or any suitable communications network. When a participant "logs in" via a client 218'x', the participant's login identity determines which set of access permissions apply. Access control services 206 determine, according the appropriate set of permissions (212, 212A, 114 or 116) which aspects of conference services can be controlled by each client 218'x', e.g., by refusing requests for access to unauthorized functions and/or by disabling user interface features that provide access to unauthorized functions. The moderator's login identity identifies him as the moderator, etc. In FIG. 2, a moderator participant at client 218A is logged in as the moderator, alternate moderator participants at clients 218B and 218C are logged in as alternate moderators, while conference participants at all other clients 218'x' are logged in as participants. The moderator participant can designate any participant to be a presenter, giving that participant presenter status as defined by the presenter permissions.

Those of ordinary skill in the art will immediately understand there are many possible variations on the inventive technique of providing alternate moderator capability to the networked conferencing system. For example, the conference server could be adapted to allow the primary moderator to designate one or more alternate moderators at the time the conference is created. Alternatively and/or additionally, the conference server could be adapted to permit the primary moderator to add and/or remove alternate moderators at any time after the conference in created. Such adaptations are fully within the spirit and scope of the present invention.

Another adaptation of the present inventive technique would be to provide the conference server with the ability to permit alternate moderators to designate and/or remove additional alternate moderators can be granted to one or more alternate moderators. The moderator would control whether such permission would be granted to the alternate moderators and to which alternate moderators the permission would apply.

Another adaptation of the present inventive technique would be to provide the conference server with the ability to let the moderator transfer primary moderator status to another individual (by identifying the "new" primary moderator) after the conference is created. This allows the moderator the option of stepping down and permitting another individual to take control of conference management.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described inventive components (servers, clients, permissions, etc . . . ) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A networked conferencing system comprising:
   a conference server;
   conference resources controlled by the conference server;
   one or more conference clients by which conference participants communicate with the conference server via a communications network;
   a set of moderator permissions by which the conference server controls moderator access to moderator functions;
   at least one set of alternate moderator permissions by which the conference server controls alternate moderator access to moderator functions;
   means to identify a moderator participant logged in as a conference client;
   means to identify one or more alternate moderator participants, each logged in as a conference client; and
   means for the moderator participant to designate one or more alternate moderator participants prior to the convening of the whereby the alternate moderator participants can at least one set of alternate moderator permissions prior to the convening of the conference.

2. A system according to claim 1, wherein the moderator participant designates one or more alternate moderator participants at a time of conference creation.

3. A system according to claim 1, further comprising:
   means for the moderator to add and remove alternate moderator participants at any time after conference creation.

4. A system according to claim 1, wherein a single set of alternate moderator permissions applies to all alternate moderator participants.

5. A system according to claim 1, wherein separate sets of alternate moderator permissions apply to selected alternate moderator participants.

6. A system according to claim 1, further comprising:
   means for at least one alternate moderator participant to designate other alternate moderator participants.

7. A system according to claim 1, wherein at least one alternate moderator participant is granted the same permissions as the moderator.

8. A system according to claim 1, further comprising means for the moderator participant to transfer moderator status to another participant.

9. A method for providing networked conferencing, comprising the steps of:
   providing a providing conference resources, said resources being controlled by the conference server;
   providing one or more conference clients by which conference participants communicate with the conference server via a communications network;
   providing a set of moderator permissions by which the conference server controls moderator access to moderator functions;
   providing at least one set of alternate moderator permissions by which the conference server controls alternate moderator access to moderator functions;
   identifying a moderator participant logged in at a conference client; and
   identify one or more alternate moderator participants, each logged in at a conference client; and
   designating one or more of the alternate moderator participants prior to the convening of the conference whereby the alternate moderator participants can at least have access to one set of alternate moderator permissions prior to the convening of the conference.

10. A method according to claim 9, including the step of having the moderator participant designate one or more alternate moderator participants at a time of conference creation.

11. A method according to claim 9, further comprising the step of:
    providing means for the moderator to add and remove alternate moderator participants at any time after conference creation.

12. A method according to claim 9, including the step of applying a single set of alternate moderator permissions to all alternate moderator participants.

13. A method according to claim 9, including the step of applying separate sets of alternate moderator permissions to selected alternate moderator participants.

14. A method according to claim 9, further comprising the step of:
    providing means for at least one alternate moderator participant to designate other alternate moderator participants.

15. A method according to claim 9, including the step of granting at least one alternate moderator participant the same permissions as the moderator.

16. A method according to claim 9, further comprising the step of:
    providing means for the moderator participant to transfer moderator status to another participant.

17. A system for networked conferencing, comprising:
    a set of conference resources;
    a set of moderator access permissions;
    at least one set of alternate moderator access permissions;
    a plurality of conference clients;
    a conference server, said conference server further comprising conference control services and access control services, said conference serving being operative to communicate with conference clients to control access to conference resources according to the set of permissions associated with a conference participant logged in at each conference client;
    means to identify a moderator participant logged in at a conference client;
    means to identify one or more alternate moderator participants logged in at one or more respective conference clients; and
    means for the moderator participant to designate one or more alternate moderator participants prior to the convening of the conference whereby the alternate moderator participants can at least have access to one set of alternate moderator permissions prior to the convening of the conference.

* * * * *